United States Patent
Tamer et al.

[11] Patent Number: 6,035,412
[45] Date of Patent: Mar. 7, 2000

[54] RDF-BASED AND MMF-BASED BACKUPS

[75] Inventors: Philip Tamer, Framingham; Yoav Raz, Newton, both of Mass.

[73] Assignee: EMC Corporation, Hopkinton, Mass.

[21] Appl. No.: 08/820,912

[22] Filed: Mar. 19, 1997

Related U.S. Application Data

[63] Continuation-in-part of application No. 08/617,689, Mar. 19, 1996, Pat. No. 5,852,715.

[51] Int. Cl.[7] .................................................. G06F 11/00
[52] U.S. Cl. .................................... 714/6; 707/204
[58] Field of Search ................. 395/182.04; 707/204

[56] References Cited

U.S. PATENT DOCUMENTS

| | | |
|---|---|---|
| 5,161,103 | 11/1992 | Kosaka et al. . |
| 5,212,784 | 5/1993 | Sparks ..................................... 395/575 |
| 5,267,148 | 11/1993 | Kosaka et al. . |
| 5,276,860 | 1/1994 | Fortier et al. ........................... 395/575 |
| 5,276,867 | 1/1994 | Kenley et al. ........................... 395/600 |
| 5,495,606 | 2/1996 | Borden et al. . |
| 5,555,169 | 9/1996 | Namba et al. . |
| 5,561,798 | 10/1996 | Harderle et al. . |
| 5,586,315 | 12/1996 | Narang et al. . |
| 5,592,660 | 1/1997 | Yokota et al. . |
| 5,594,900 | 1/1997 | Cohn et al. . |
| 5,642,496 | 6/1997 | Kanfi ....................................... 395/489 |
| 5,740,433 | 4/1998 | Carr et al. ............................... 395/618 |
| 5,799,323 | 8/1998 | Mosher, Jr. et al. .................... 707/202 |
| 5,857,208 | 1/1999 | Ofek . |

OTHER PUBLICATIONS

Koop, Peggy, "Replication at Work," DEMS, V8, n3, p54(4) (Mar. 1995).

*Primary Examiner*—Ayaz R. Sheikh
*Assistant Examiner*—Jigar Pancholi
*Attorney, Agent, or Firm*—Fish & Richardson P.C.

[57] ABSTRACT

A method of generating in a tertiary storage device a backup copy of data, the method including the steps of writing data to a first set of storage volumes; while data is being written to the first set of storage volumes, mirroring the contents of the first set of storage volumes into a second set of storage volumes; after an amount of data has been written to the first set of volumes, terminating the mirroring; while mirroring is terminated, continuing to write data to the first set of volumes thereby causing the second set of volumes to become unsynchronized from the first set of volumes; while the mirroring is terminated, backing up data stored in the second set of volumes to the tertiary storage device; after backing up the second set of volumes, resuming mirroring of the first set of volumes to the second set of volumes; and after resuming mirroring, incrementally resynchronizing the first and set sets of volumes with each other.

10 Claims, 15 Drawing Sheets

FIGURE 3

|  | MASTER: R1 /5 | | SLAVE: R2 /5 | |
| --- | --- | --- | --- | --- |
|  | M1 | M2 | M1 | M2 |
| $t_1$ | 0 | 0 —11 | 1 | 0 |
| $t_2$ | 0 | 1 | 1 | 0 |
| $t_3$ | 0 | 1 | 0 | 0 |
| ⋮ | | | | |
| $t_n$ | 0 | 0 | 0 | 0 |

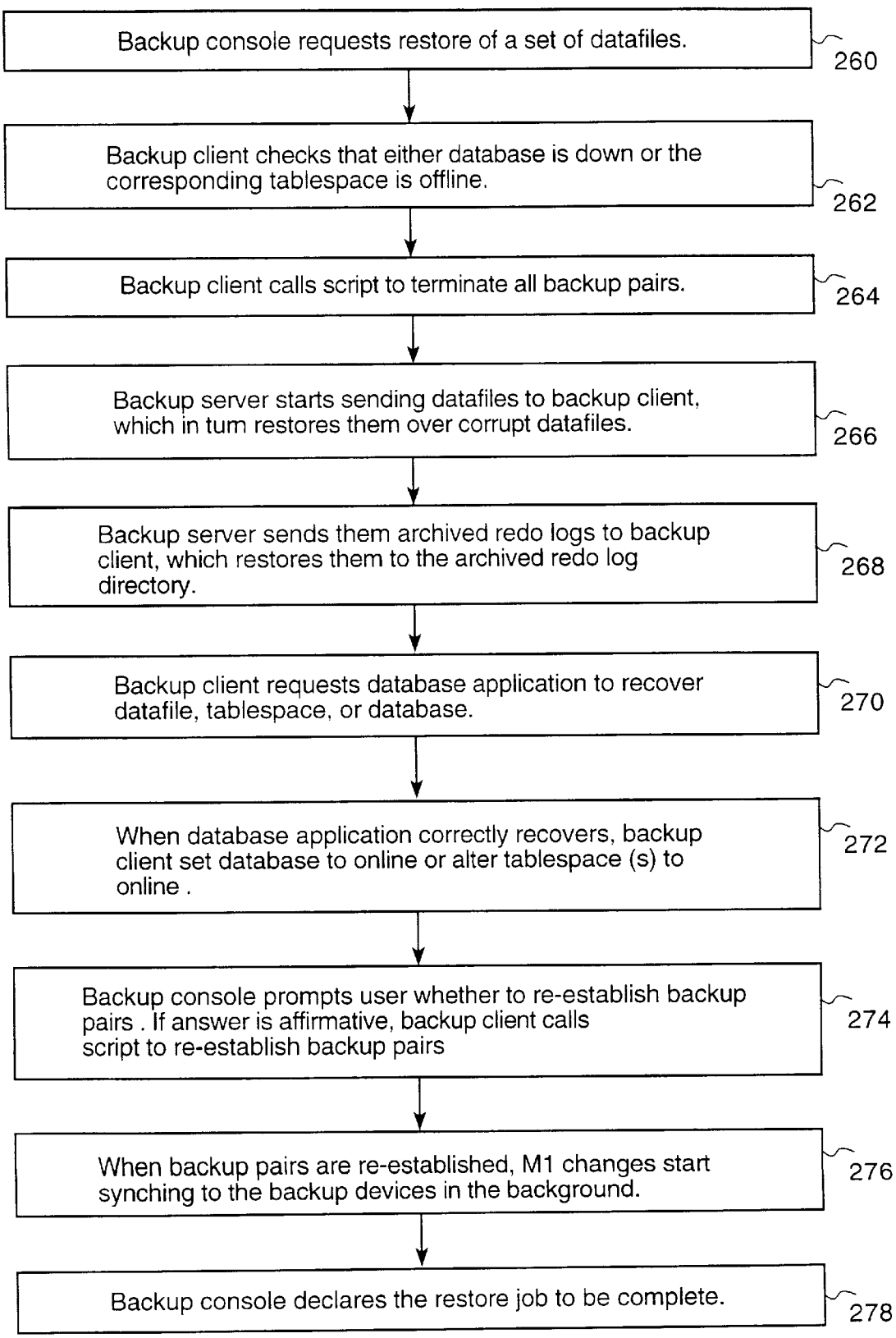

RDF-BASED AND MMF-BASED BACKUPS

This is a continuation-in-part of U.S. patent application Ser. No. 08/617,689 now U.S. Pat. No. 5,852,715 filed Mar. 19, 1996, incorporated herein by reference.

BACKGROUND OF THE INVENTION

The invention relates generally to database backup systems and procedures and more particularly to database backup systems and procedures that are implemented using a mirror copy of the primary database.

Database systems, like many other things, are vulnerable to failures, sometimes disastrous enough to corrupt the data within the database so that it is no longer usable. To protect against such failures, database managers typically backup their data periodically. The backup operation is usually done during a window of time when loads on the database system are the lowest, e.g. late at night. If there is a window during which no work is being done, the backup can be done offline. However, if no such period exists, the backup must be done online (i.e., while other transactions are being processed). In either event, once the backup has been performed, if a failure or mistake corrupts or destroys the data on the primary online database, it can be restored from a copy that was generated during the backup operation.

Databases continue to grow in size while backup windows are shrinking. Today storage systems can handle terra bytes of data. Incremental backups for this amount of data are not usually available. Two conventional ways for doing backup are: (1) to move data through a network connected to the backup server; or (2) to run special backup software on the same machine that is running the database application. Due to bandwidth limitations of most networks, going through the network can be slow. Whereas, running backup software tends to put a considerable load on the data storage system and the host processor, e.g. the mainframe computer. While they are loaded down with handling the backup, their capability for handling business transactions goes way down. And if there is a very high volume of business transactions, the system can easily become unacceptably unresponsive. Alternatively, the backup rate goes down and the backup process will take an unacceptably long period of time. In other words, current backup solutions leave something to be desired because data is either moved through a slow network or excessive loads are placed on the database host/storage subsystem.

Two parallel avenues have been pursued for solutions. One solution path has been a database server managed backup. Data, mostly in the form of incremental changes, is passed by the database backup server to third party backup management software. The backup management software stores the data to tertiary storage. The tertiary storage can be directly attached to the database node or it can be services provided over the network. An advantage of this approach is that support for incremental backups should result in less data that needs to be backed up. Thus, loads on the resources will be reduced. Another advantage is that data integrity verification occurs at the backup times. A disadvantage is that incremental backups can reduce but they do not eliminate resource loads. Complete backups still place excessive loads on the system.

A second solution path has been to do physical backups at the datafile level. In this case, backups are performed outside of the database server. And all interactions with the database management system are done via management interfaces. The backup management software stores data to tertiary storage with minimal or no loads on the database server/storage subsystem. That is, the paths to the tertiary storage typically bypass or minimize use of the network. An advantage of this approach is that it should result in high speed backups since loads on the database host/storage subsystem are minimal. But a disadvantage is that incremental backups are very difficult and likely not to be feasible. In addition, data integrity verification is usually not feasible at backup time.

SUMMARY OF THE INVENTION

In general, in one aspect, the invention is a method of generating in a tertiary storage device a backup copy of data. The method includes the steps of writing data to a first set of storage volumes; while data is being written to the first set of storage volumes, mirroring the contents of the first set of storage volumes into a second set of storage volumes; after an amount of data has been written to the first set of volumes, terminating the mirroring; while mirroring is terminated, continuing to write data to the first set of volumes thereby causing the second set of volumes to become unsynchronized from the first set of volumes; while the mirroring is terminated, backing up data stored in the second set of volumes to the tertiary storage device; after backing up the second set of volumes, resuming mirroring of the first set of volumes to the second set of volumes; and after resuming mirroring, incrementally resynchronizing the first and set sets of volumes with each other.

Preferred embodiments include the following features. The method further includes the steps of providing a single data storage system with a plurality of data storage volumes; and partitioning the plurality of data storage volumes into the first and second sets of storage volumes. Alternatively, the method includes the steps of providing a first data storage system; providing a second data storage system that is separate form the first data storage system; directly connecting the first and second data storage systems through a communication link; establishing the first set of storage volumes within the first data storage system; and establishing the second set of storage volumes within the second data storage system, and wherein the step of resynchronizing the first and second sets of storage volumes takes place over the communication link.

Also in preferred embodiments, the method further includes the steps of defining a first map of the first set of storage volumes; and defining a second map of the second set of storage volumes. The step of incrementally resynchronizing the first and second sets of storage volumes involves using the first and second maps to identify which portions of the second set of storage volumes need to be refreshed from the first set of storage volumes to achieve resynchronization. Also, the method includes the steps of generating archived redo logs for transactions that are applied to data stored in the first set of storage volumes; after backing up the second set of volumes, sending the archived redo logs from the first data storage system to the tertiary storage device; and storing the archived redo logs in the tertiary storage device along with the backed up data that was stored in the tertiary storage device. In addition, the method further includes providing a tape drive storage device as the tertiary storage device. Also, the method includes providing a first host processor connected to the first data storage system, wherein the first host processor is running a database application which is processing transactions and writing data from those transactions to the first set of storage volumes; providing a tape drive storage device as the tertiary storage device; and providing a second host processor connected to the second data storage system, wherein tape drive storage device is connected to the second host processor which performs the backing up of data in the second set of volumes to the tape drive storage device.

Also in preferred embodiments, the first map includes a first set of submaps equal in number to the number of volumes in first set of storage volumes and each of which corresponds to a different one of the volumes in the first set of storage volumes and the second map includes a second set of submaps equal in number to the number of volumes in second set of storage volumes and each of which corresponds to a different one of the volumes in the second set of storage volumes. Each of the volumes of the first and second sets of volumes is made up of a corresponding set of tracks, and each of the submaps of the first and second sets of submaps has a number of records that is equal to the number of tracks in the set of tracks of the volume corresponding to that submap. The method also includes the steps of generating a first ordered list of identifiers of records within the first map that have changed; and generating a second ordered list of identifiers of records within the second map that have been changed using the first and second generated lists of identifiers to perform incremental resynchronization.

The invention makes it possible to do a fast online backup to tertiary storage without having to shut the system down while the backup is being performed. Mirroring is done at the physical level either within the same data storage unit or between two data storage unit that are connected to each other through a high speed communication link. Thus, when a transaction appears in the primary storage system, it also appears in the mirrored copy at basically the same time. The mirrored copy provides the copy from which the backup copy is generated.

The invention makes it possible to achieve very high backup rates with almost no effect on the primary server except for sending the archived redo logs to the backup server. And it is extensible to many other database applications. It also makes fast partial and/or complete database restores possible.

Other advantages and features will become apparent from the following description of the preferred embodiment and from the claims.

BRIEF DESCRIPTION OF THE DRAWINGS

FIG. 3 illustrates a bit map which is used by the data storage systems to synchronize the primary database and the copy with each other;

FIG. 8 presents a flow chart of the steps for performing a partial restore in the system shown in FIG. 2.

DESCRIPTION OF THE PREFERRED EMBODIMENTS

Figure 1A:
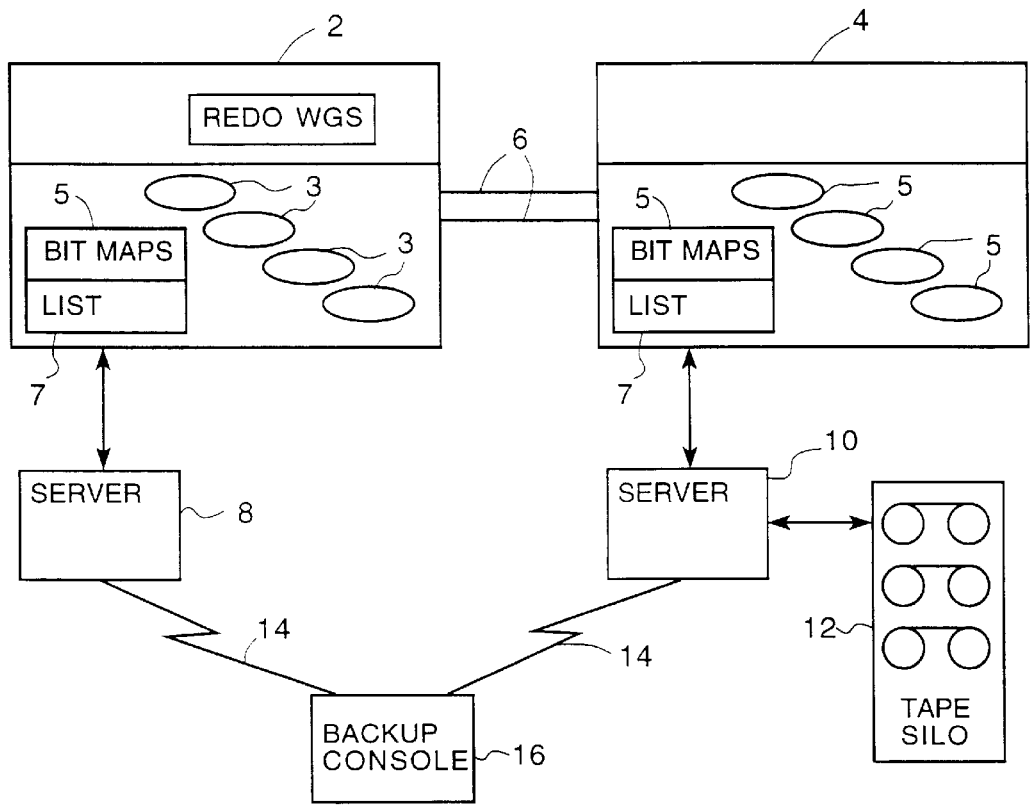
FIG. 1A is a block diagram of database system with backup capability and that utilizes one data storage unit for the primary database and a second remotely located data storage unit for a mirror copy of the contents of the physical devices that store the primary database.
Figure 1B:
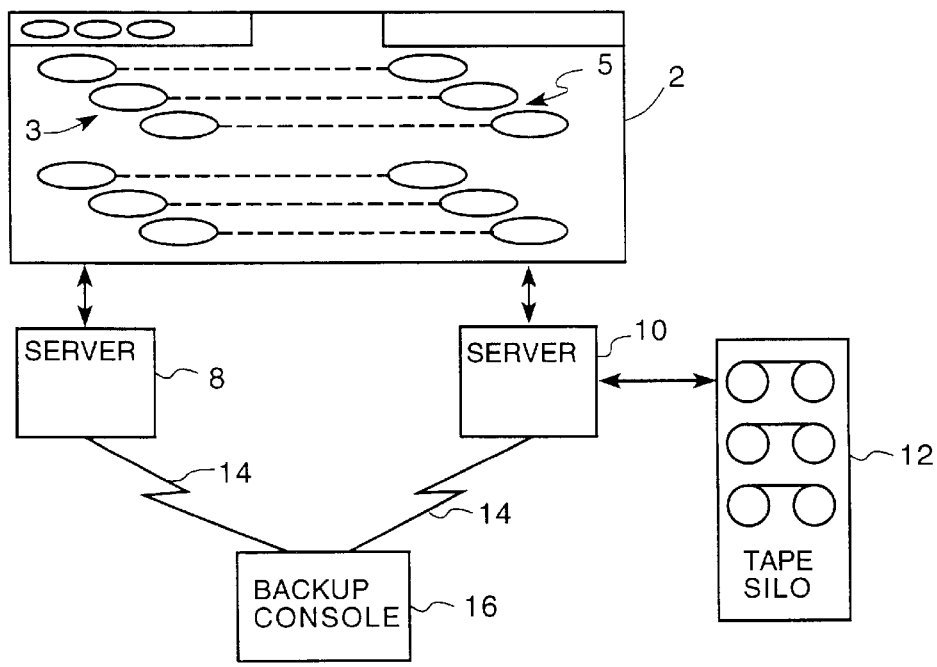
FIG. 1B is a block diagram of another database system with backup capability and that utilizes a single data storage system which stores both the primary database and a local copy of the primary database.

The System Architectures:

Two general embodiments will be described. One embodiment, which is referred to as an RDF-based (Remote Data Facility) implementation, employs two data storage systems 2 and 4, as shown in FIG. 1A. The other embodiment, which is referred to as an MMF-based (Multiple Mirror Facility) implementation, employs a single data storage system 2, as shown in FIG. 1B.

Referring to FIG. 1A, in the RDF-based implementation, the two data storage systems 2 and 4, which may be located at geographically remote locations from each other, are connected together by a high speed data communication link 6. If they are remotely located from each other, in the event of a natural disaster or hostile act that destroys one of the data storage systems, the other data storage system will likely not be affected and can be used to support continuing database transactions.

For reasons that will become apparent shortly, data storage system 2 will also sometimes be referred to as the master unit and data storage system 4 will also sometimes be referred to as the slave unit. The master unit stores the primary database and the slave unit stores a copy from which backups to more permanent data storage are made. During a disaster recovery, the slave unit can serve as the master unit.

A server or host processor 8, which is sometimes also referred to as the backup client, is connected to data storage system 2 and is running database application, which can be a commercially available product, such as Oracle 7 by Oracle Corporation of Redwood Shores, California. The database application is continuously processing transactions and storing the results of those transactions in data storage system 2 to which its host processor is connected. Another server or host processor 10, which is sometimes also referred to as the backup server, is connected to the other data storage system 4. Its primary role in the embodiments described herein is to handle archiving of backup copies of the database to more permanent storage, such as the tape drives located in a tape silo 12 or tape farm. It also assists in the restoration and recovery of the primary database when necessary.

Both host processors are also connected to a computer network 14. In addition, there is also a backup console 16 that is connected to the same computer network and that controls and coordinates the backup, restoration, and recovery processes which are described herein.

The specific hardware that is used for the host processors and the backup console is not of great importance. Any commercially available equipment may be used. In addition, although only one host processor is shown connected to each data storage system, it should be understood that there could in fact be a plurality of host processors connected to each box.

As indicated above, the data storage systems 2 and 4 have two features that are relevant to the embodiments described herein. One feature is referred to as a remote data facility (RDF) and the other is referred to as a multiple mirror facility (MMF). Within both data storage systems 2 and 4, there is an array of storage disks 3 and 5, respectively. These disk arrays represent a set of physical volumes, typically each volume corresponding to an individual disk. In the RDF-based implementation, the volumes which store the database files, also referred to as the source volumes (R1), are mirrored to corresponding volumes on the other data storage system, also referred to as the target volumes (R2). In other words, the data storage systems are configured so that any data that is written to any of the mirrored volumes in the master unit 2 is automatically written to corresponding volumes in the slave unit 4. The database that is stored in the R1 volumes is also sometimes referred to as M1 and the copy that is stored in R2 is sometimes also referred to as M2.

The host processor that is attached to the master unit may access the source volumes for read/write operations. However, during normal I/O operations, the target volumes cannot be accessed by the user applications that are running on the host processor that is attached to the slave unit. The transfer of the data to the slave data storage system takes place over the high speed link 6 that connects the two data storage systems and is controlled by the data storage systems.

The RDF feature also enables the user, through an appropriate set of commands, to disconnect the slave unit from the master unit by terminating the communication link and write enabling the mirror volumes in the slave unit. When that is done, the updates which occur to the master unit will, of course, no longer be sent automatically to the slave unit. However, the data that is stored in the slave unit can then be used to support other functions such as decision support, restore, and backup.

The MMF feature is similar to the RDF feature except that the mirror copy is generated within the same box as the primary database. This is done by configuring the data storage system to define two sets of devices or volumes, a first set and a second set with each of its members paired with a corresponding member in the first set. A host processor, which is connected to the data storage unit, writes its data to the first set of devices and the data storage system generates a mirror copy of that data in the second set of volumes which are paired with the first set of volumes. Thus, every write to the first set of devices also causes an automatic write of the same data to the second set of devices. In the MMF embodiment, the primary database will sometimes be referred to as M1; whereas, the mirror copy will be referred to as M2. As in the case of RDF, the host processor can instruct the data storage system to terminate the pairing between the volumes that store the primary database and the volumes that store the backup copy. When that is done, the volumes containing the backup coy are write enabled so that backup and DSS functions can be performed using the backup copy.

In the MMF-based implementation depicted in FIG. 1B, the same functionality as that described above is implemented in a single data storage system. In other words, the backup copy is generated and stored in the same box as the primary database is stored. To do this the disks are partitioned to form at least two sets, one set storing the primary database a local mirror of that database, and the other set storing the mirrored copy of the data in the volumes storing the primary database, i.e., the version from which a backup to the tape drives will be made. As in the previous embodiment, the host processors that are attached to the data storage system are prevented from writing to the backup copy while the mirror is connected internally. However, when the internal link is broken so that writes to the primary database are not automatically written to the backup copy (i.e., when the paired volumes are unpaired), then the backup copy is write enabled so that a backup to tape can be performed.

Note that in FIG. 1B there are two host processors 8 and 10 connected to the data storage system 2. However, it might also be the case that there is only a single host processor that runs both the database application as well as the backup server programs.

In the described embodiments, each of data storage systems 2 and 4 is a Symmetrix Model 5XXX or Model 3XXX Series Integrated Cached Disk Array (ICDA), though, of course, other equipment including other commercially available equipment could be used. The Symmetrix Model 5XXX and Model 3XXX ICDA's, which are products of EMC Corporation of Hopkinton, Mass., are high performance data storage systems designed for online data storage.

The following details about the internal structure and operation of data storage system 2 generally refer to the Symmetrix™ data storage systems. However, as noted above, other known architectures may also be used.

Figure 2:
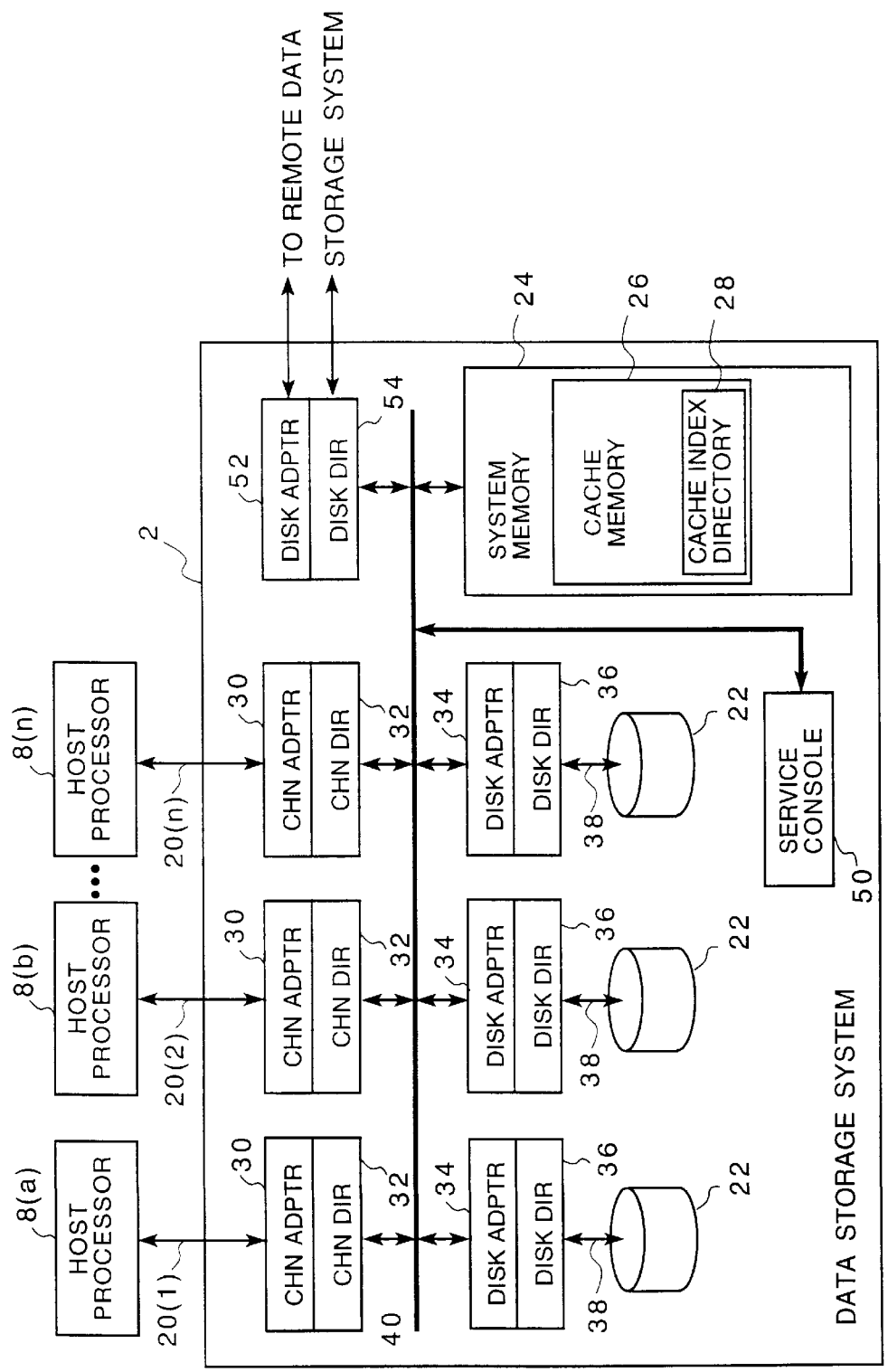
FIG. 2 is a block diagram of the internal structure of the data storage systems that are shown in FIGS. 1A and 1B.

Referring to FIG. 2, data storage system 2 includes multiple arrays of disk devices 22 and a system memory 24. A portion of system memory 24 implements cache memory 26. The multiple arrays of disk devices 22 provide a permanent data storage area and cache memory 26 provides a temporary data storage area. In the currently available Symmetrix ICDA there can be up to 512 volumes, collectively capable of storing over a terrabyte of data. Each disk device 22 includes a head-disk assembly, a microprocessor, and a data buffer which enables the data storage system to provide for parallel processing of data. In the described embodiment, system memory 24 is implemented by high-speed random-access semiconductor memory. Within cache memory 26 there is a cache index directory 28 which provides an indication of what data is stored in cache memory 26 and the address of that data in cache memory 26. Cache index directory 28 is organized as a hierarchy of tables for devices, cylinders, and tracks of data records, as further described in U.S. Pat. No. 5,206,939, issued Apr. 27, 1993, and incorporated herein by reference.

There is a group of channel adapters 30 and channel directors 32 that provide interfaces through which host processors 8 (e.g. host processors 8(a), 8(b), . . . 8(n)) connect to data storage system 2. Each channel adapter 30 provides for direct attachment to the physical host connections. Channel director 32, which handles I/O requests from host processors 8, contains a microprocessor that processes commands and data from host processors 8 and manages accesses to cache memory 26. It uses cache index directory 28 which is stored in cache memory 26 to determine whether the request can be satisfied out of the cache or whether the data must be obtained from disk devices 22. The particular data that is stored in cache memory is determined by the data access patterns of the data base applications that are running. Channel directors 32 write data from host processors 8 into cache memory 26 and update cache index directory 28. They also access cache index directory 26 and read data from cache memory 24 for transfer to host processors 8.

There is also a disk adapter 34 and a disk director 36 through which each disk device array 22 is connected to cache memory 26. Disk adapter 34 interfaces to multiple SCSI buses 38 to which disk device arrays 22 are connected. Disk director 36 manages accesses to the disks within disk device arrays 22. Disk Director 36 stages data from the disk device arrays to cache memory 26 and it updates cache index directory 28, accordingly. It also de-stages or writes-back data from "written-to" blocks in cache memory 26 to the disk device arrays and again updates cache index directory 28, accordingly.

Disk adapters 34 and channel adapters 30 access system memory 24 through a high-speed, parallel line system bus 40. System memory 24 is implemented by multiple memory boards. Only one accesses to any given memory board may occur at any given time, however, multiple memory boards may be accessed at the same time to support concurrent operations.

Data storage system 2 can be configured into multiple logical volumes. Typically, a volume corresponds to a single disk device. A service console 50 within data storage system 10 enables the user to configure the data storage, i.e., to define the logical volumes and to specify which logical volumes are accessible through which host connections 20.

In general, data storage system 2 can be configured to implement local mirroring, which is a feature that is in addition to the RDF and MMF features described elsewhere. When configured to implement local mirroring, the data storage system generates and maintains two copies of data by writing all modified data to two different disk devices within the same data storage system and it does this in a manner that is transparent to the host processors. Everything that is written to one volume is also written to a mirror volume and reads occur to both volumes, whichever produces the faster response. The data storage system handles write operations to a mirrored logical volume as normal write operations. That is, data is first written to cache memory. Then, the disk adapters destage the data to both devices in the mirrored pair maintaining the identical copies of the data. Further details about one particular implementation of mirroring are presented in U.S. patent application Ser. No. 07/587,253, incorporated herein by reference.

In the Symmetrix Model 5XXX Series, the high speed link 6 is implemented in accordance with the ESCON architecture of IBM, an architecture that is known to persons skilled in the art. High speed link 6 includes a dual optical fiber connection that uses serial data transmission. Independent processing units at either end of the connection control data movement from the connection to storage. More specifically, data storage system 10 includes a disk adapter 34 and a disk director 36, which couple internal bus 40 within the data storage system to high speed link 6. Similar components are present in the other data storage system.

The Bit Maps

When the backup copy of the database becomes disconnected from the primary database, which occurs during backup, for example, the two databases are likely to get out of synchronization with each other. This happens, at least in part, because the server on the master unit is permitted to continue processing transactions and updating the primary database. It will also happens because any backup to the tape drives that is performed by the backup server will also typically result in writes to the backup copy in the slave unit. Therefore, a mechanism is provided in each of the data storage systems for keeping track of where the changes occur and backing them out. According to this mechanism, the data storage system sets up and uses of an array of bit maps 5 (see FIG. 3). The array includes a bit map for each of the mirrored volumes. Without this mechanism, any write that is done to the slave side would necessitate that the database be completely copied back to the slave side to establish resynchronization with the main database when the link is brought back up. Instead, resynchronization of the two databases can be done incrementally and will require only the transfer of data that has changed The bit maps are used to identify which portions of the volumes are out of synch with their counterparts. A controller (e.g. the directors in the case of the data storage system shown in FIG. 2) in each data storage system maintains its own bit map for each volume. In the described embodiments, the highest level of detail in each bit map is a track. In other words, referring to FIG. 3, each bit map includes a record or bucket 11 for each track $t_j$ of the disk which it is representing and each record or bucket includes a bit for M1, corresponding to the primary database in the master unit, and a bit for M2, corresponding to the database copy in the slave unit. The controller uses the bit maps to keep track of which tracks have been modified when the backup mirroring is not operating, e.g. when the link is down in the case of the embodiment of FIG. 1A, or when the pairs within the data storage system are uncoupled in the case of the embodiment of FIG. 1B.

In the Symmetrix data storage systems, each volume can have, for example, 65K tracks, though considerably more are possible depending on how the system is configured. Thus, the bit map for each volume can be very large, including over 65K records.

In each record or bucket, a zero entry indicates that no changes have been made to the corresponding track since the link came down and a one entry generally indicates invalid data, i.e., a change has been made to the corresponding track in one database and that change was not communicated to the other database. Thus, a one in any field indicates that it is out of synchronization with the corresponding track on the other side since it contains more recent, i.e., dirty, data. Thus, each time a write occurs to a given track on the master side, the controller sets corresponding bit in the bit map (i.e., M2) to one. For example, if track N is written to, then the bit in the M2 field of the record for track N is set to one. Similarly, on the slave side, each write to the database that occurs on that side is recorded by setting the corresponding bit in the M1 field of the appropriate record in the bit map.

To optimize the resynchronization operation which occurs when the two databases, the controller also generates an ordered list 7 of modified tracks. Each entry in the ordered list 7 identifies a volume (i.e., the bit map) and a particular track within that volume. With such a list, the controller can avoid having to scan through what may be a huge number of records to find only those that have recorded a change. The immensity of that scanning task can be appreciated by looking at the numbers involved. For example, in the Symmetrix data storage systems there can be as many as 512 volumes, and each of which can have 65K tracks. The modifications which may have occurred in one disk may have only affected four tracks scattered throughout the volume. To find the identity of the tracks that have been modified through scanning requires checking all of those 65K records. With the list of modified tracks, however, the controller can jump directly to the relevant entries in the relevant bit maps.

As will become apparent in the following description, the synchronizing which takes place between R1 and R2 (or M1 and M2) after a link has been brought back up takes place in the background. While it takes place, with the aid of the bit maps, both systems will know where the best data is. Thus, the database activity can be directed to valid tracks whether they are in R1 or R2.

Another use of the bit maps arises when a physical disk fails. Suppose the system does not have any local disk protection (e.g. local mirroring) and a disk fails. In that event, the system can simply set all of the M2 bits for the disk that has failed and redirect activity involving that disk to the backup copy in the slave unit (or the paired volumes). When the disk is replaced, the bit map is then used to synchronize the new disk with its corresponding disk in the slave unit (or with the paired disk on the same box).

Overview of Backup and Restore Operations:

In general, the system is set up to mirror a set of one or more volumes both internally and to the remote data storage system. The mirroring to the remote system occurs over the high speed link. When it is time to prepare a backup, the link is cut by software and the mirroring to the remote data storage system is halted.

Prior to cutting the link, it should be noted that the database in the master unit is R/W enabled but the database copy in the slave unit is not W enabled. Thus, while the link is up, no host processor connected to the slave unit can write to the volumes that contained the copy of the data in the corresponding volumes on the master unit. However, after the link is brought down, the volumes on the slave side are W enabled to permit access the table space during the backup operation. When a table access occurs, typically a write also takes place. These writes are all recorded in a bit map that is maintained on the slave unit side.

Note, that until the backup to tertiary storage is completed, writes to the data in the database copy stored in the slave unit are not permitted. Any writes to data prior to completing the backup would render that data invalid. After the backup to tape storage is complete, however, then writes to the data may take place, e.g. as in the case when the disconnected copy is used to support decision support functions.

The backup client can still continue to make changes to the primary database but those changes will no longer be communicated to the remote data storage system, at least for the period during which the link remains down. However, the local host processor keeps track of all changes that occur to the primary database by logging all of them in an archived redo log file.

The backup is performed using the mirrored copy in the remote data storage system. When the backup operation at the remote data storage system is finished, the backup client moves all of the archived redo logs from the database server to the backup server. Since this transfer takes place over the network, it will generate a load on the network, but the load is minor in comparison to the alternative of sending all backup data over the network at the time of backup.

When the archived redo logs are completely transferred to the backup server and moved into the backup facility, e.g. the tape silo, the backup is finished. At that point the link is reestablished and the main disks and the mirrored disks are incrementally resynchronized, i.e., only the changes that were made to the databases while the link was down are transferred. The incremental resynchronizing of the two groups of disks (i.e., the two databases) takes place in the background and transparently to the host processors. The resynchronization is done by sending only the changes which occurred in the main system to the backup system along with any tracks that have to be refreshed in the slave due to writes which took place there during the backup procedure. To aid in this process, a log is maintained of the changes that occurred to the primary database (M1) and the backup database (M2) when the link was down. In essence any changes that were done to the primary database (M1) are sent over to the mirrored side and any changes that occurred to the backup database (M2) when the link was down are erased (by overwriting them with data from corresponding portions of the primary database). Thus, instead of having to rewrite the entire database to the slave side to resynchronize the two databases with each other, the incremental resynchronization technique enables one to only transfer the data for tracks that were modified while the link was down. This greatly decreases the amount of data that needs to be transferred.

With decision support, it is necessary to make the database consistent, but this is not required with the backup copy. Therefore, the redo logs are simply saved and used later to achieve consistency during the restore operation, as described in greater detail below.

Typically a file system check will be done by the backup server when it is saving the data to tertiary storage. This involves writing to the same volumes that store the database (but not to the stored data itself), which, of course, produces dirty blocks or tracks. In the embodiments described, the data storage systems keep track of which blocks or tracks have been changed so that the changes can be erased or undone during the restore operation.

So when the link is reestablished, the two sides are resynchronized. This involves first synchronizing the bit maps so that both sides have the same views. This is done by flipping the bit map on the slave side (i.e., by transferring M1 information to M2 and by transferring M2 information to M1) and then combining the results with the bit map on the master side through a simple OR'ing operation. The result is a bit map on both sides that identifies all tracks that must be sent over to the slave side to achieve resynchronization. Then, the data storage system containing the primary database begins sending the marked tracks to the other side, i.e., all tracks which are identified as having been modified on the master side and all tracks which were identified as having been modified on the slave side. As each track on the other side is refreshed or updated, the corresponding bits are cleared.

RDF-Implemented Backup

Figure 4A:
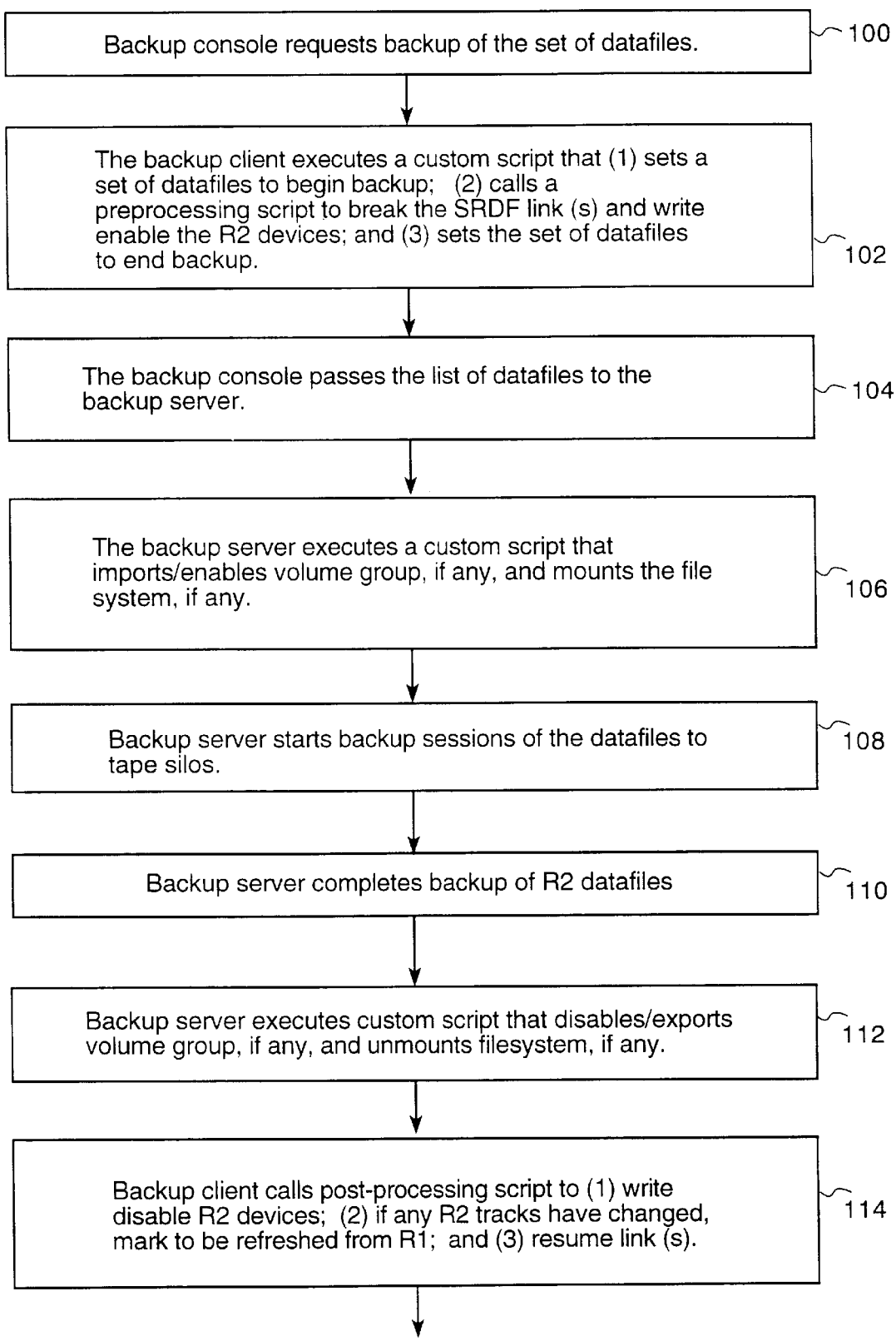
FIGS. 4A–B present a flow chart of the steps for performing an RDF-based backup.
Figure 4B:
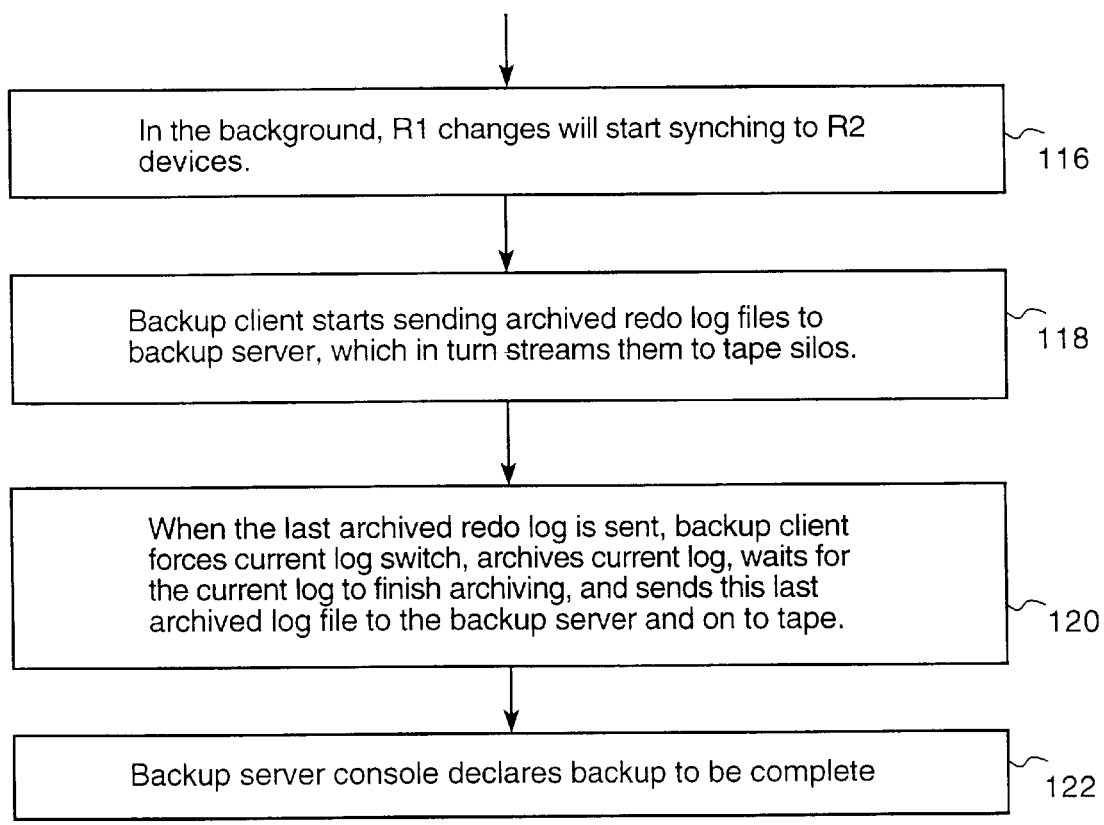

FIGS. 4A–B illustrate in greater detail the steps that are performed in creating a backup in the embodiment shown in FIG. 1A.

The backup console begins the process by requesting a backup of a specified set of datafiles (step 100). It is, of course, assumed that all of the database datafiles, except for the archived redo log directory, are on volumes that are being mirrored to the slave data storage system over the high speed link. Actually, if this setup is only for backup purposes only, i.e., no disaster tolerance or decision support are required, then the online redo log files do not have to be on the mirrored volumes either.

In response to receiving the backup request, the backup client executes a custom script that performs a sequence of operations (step 102). First, it sets a set of datafiles to begin backup. Then, it calls a pre-processing script within the data storage system to shut down the high speed link and write enable the R2 devices. Finally, it sets the set of datafiles to end backup.

The backup console passes the list of datafiles to the backup server so that the backup server can begin to perform the actual backup operation (step 104). In response, the backup server executes a custom script that imports or enables the volume group(s), if any, and it mounts the file system(s), if any (step 106). Once that is completed, the backup server starts the backup session during which it sends the identified R2 datafiles to the tape silos (step 108).

During this period when the link is down, both data storage systems use their bit maps to identify of all tracks within their volumes that are modified. For example, for each track that is modified on the master side, the master unit enters a one in the M2 field for the track of the appropriate bit map (i.e., the bit map for the volume that was modified). Similarly, on the slave side, all writes to the mirror disks are identified by entering ones in the M1 fields for the tracks of the appropriate bit maps. The bit entries on the master side identify which tracks need to be sent over to the slave side to bring the slave side up to date with the master side. And the bit map entries on the slave side identify which tracks need to be refreshed from the R1 to overwrite the changes that occurred during backup to tape.

When the backup server completes the backup of the R2 datafiles (step 110), it executes custom script that disables or exports the volume group(s), if any, and unmounts the file system(s), if any (step 112).

The backup client then calls a post-processing script (API) which when executed instructs the data storage systems to which carry out a number of functions (step 114). It write disables the R2 devices. It also determines whether any R2 tracks have changed, and if they have it marks them to be refreshed from R1. And it re-establishes the high speed link(s) connecting the slave data storage system to the master data storage system.

Once the link has been reestablished, the R1 changes start synching to R2 devices (step 116). This resyncing operation is carried out in the background and uses the bit maps to determine which tracks in R2 need to be updated by data from corresponding tracks in R1. It begins with first synchronizing the bit maps so that they are the same on both sides of the connection. That is, both units will have the same view identifying on which side the valid data resides. The synchronization of the bits maps is accomplished by flipping the bit maps on the slave side and then combining those bits maps with the corresponding bit maps on the master side. By flipping, we mean that the entries in the M1 side of the bit map are transferred to the corresponding track on the M2 side of the bit map. The result identifies all tracks in R1 that need to be sent to R2 to accomplish one of two things: (1) to forward updates from R1 to R2 which occurred as a result of the continuing transaction processing on the master while the link was down; and (2) to overwrite any modifications that might have been made to R2 while the link was down and as a result of the backup operation.

As the marked tracks are sent to R2 from R1, the data storage units clear the corresponding entries in their respective bit maps.

The backup client also starts sending its archived redo log files over the network to backup server (step 118). And the backup server, in turn, streams them to the tape silos.

When the last archived redo log is sent, the backup client forces a current log switch and it archives the current log. As soon as the backup client finishes archiving the current log, it client sends this last archived log file to the backup server which passes the log on to tape (step 120).

At that point, the backup console declares backup to be complete (step 122). No new backup session is permitted to start until the R1 and R2 devices have been fully synched via the high speed link.

RDF-Based Restores

After a backup has been completed in the manner described above, there may arise a need to perform either a partial or a complete restore of the database on the master data storage system. Each of the processes used to accomplish this will now be described.

A Partial Restore

Figure 5:
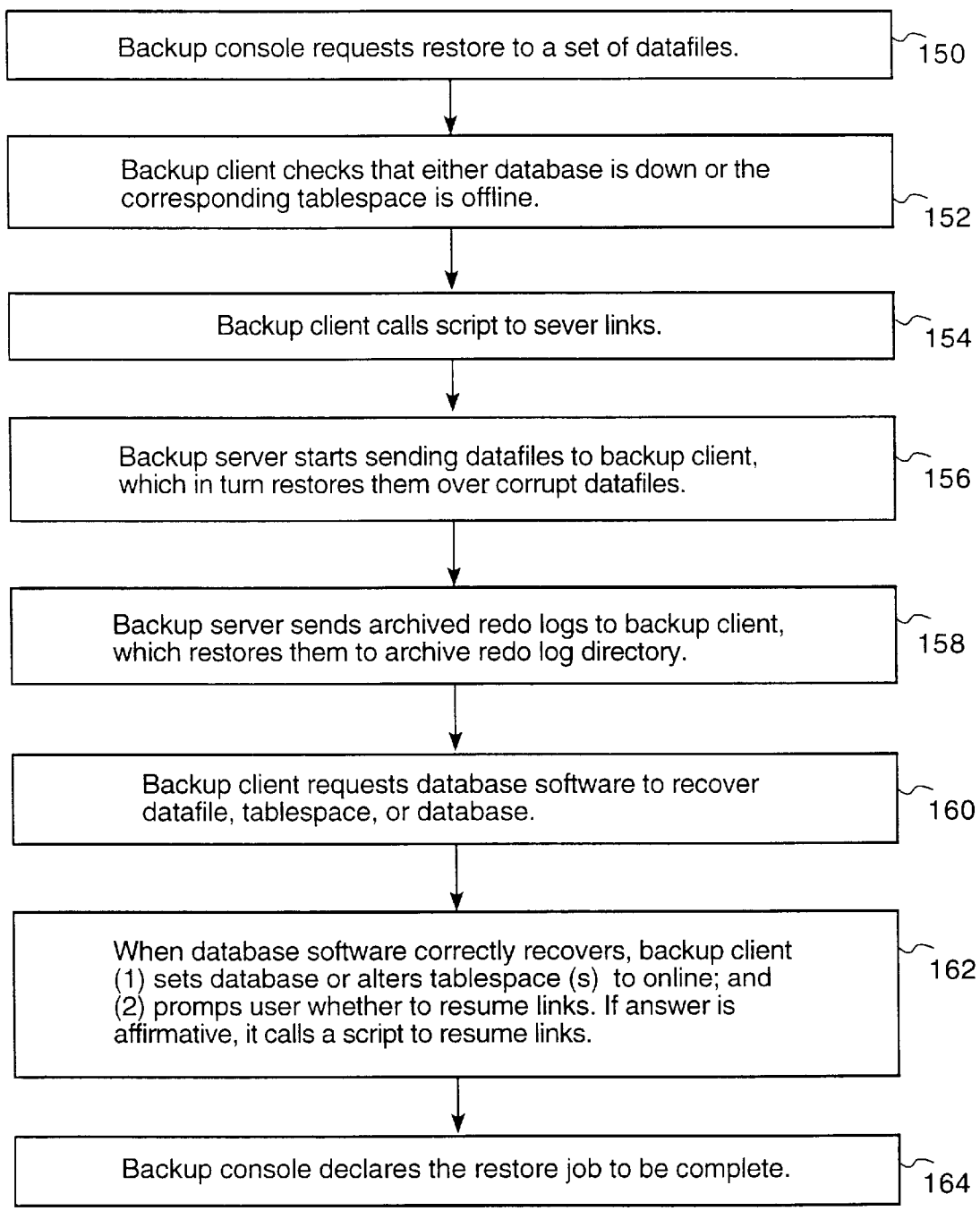
FIG. 5 presents a flow chart of the steps for performing a partial restore in the system shown in FIG. 1.

Referring to FIG. 5, to start a partial restore of the database in the master unit, the backup console requests restore to an identified set of datafiles (step 150). In response, the backup client confirms that either the database is down or the corresponding tablespace is offline (step 152). After confirming that either of these conditions exist, the backup client calls script which when executed instructs the data storage system to bring down the high speed link that connects it to the slave unit (step 154)

Once the high speed has been terminated, the backup server starts sending the identified datafiles to the backup client over the computer network (step 156). The backup client, in turn, restores them over the corrupted datafiles on its data storage unit. Once the identified datafiles have been transferred to the backup client, the backup server then sends the archived redo logs and the backup client restores them to archive redo log directory (step 158).

After restoring the archived redo logs to the directory, the backup client requests the database software to recover the datafile, tablespace, or database, whichever is appropriate (step 160). All of the changes that are made to R1 are recorded in the bit maps by entering 1's in the appropriate tracks for the R1 side. Thus, when the recovery is complete, the bit maps on the master side will identify all tracks of R1 that need to be sent to R2 to synchronize R2 with R1.

After the database software correctly performs the recovery, the backup client sets database to online or alters tablespace(s) to online; and it then prompts the user whether to reestablish the high speed link (step 162). If the user answers in the affirmative, the back client calls a script which when executed instructs data storage unit to bring up the high speed link (step 162). Once that is accomplished, the backup console declares the restore job to be complete (step 164).

With the link re-established, the master unit synchronizes R2 with R1. It does this by transferring all of the restored tracks, as identified in the bit maps, to R2.

A Complete Restore

Figure 6A:
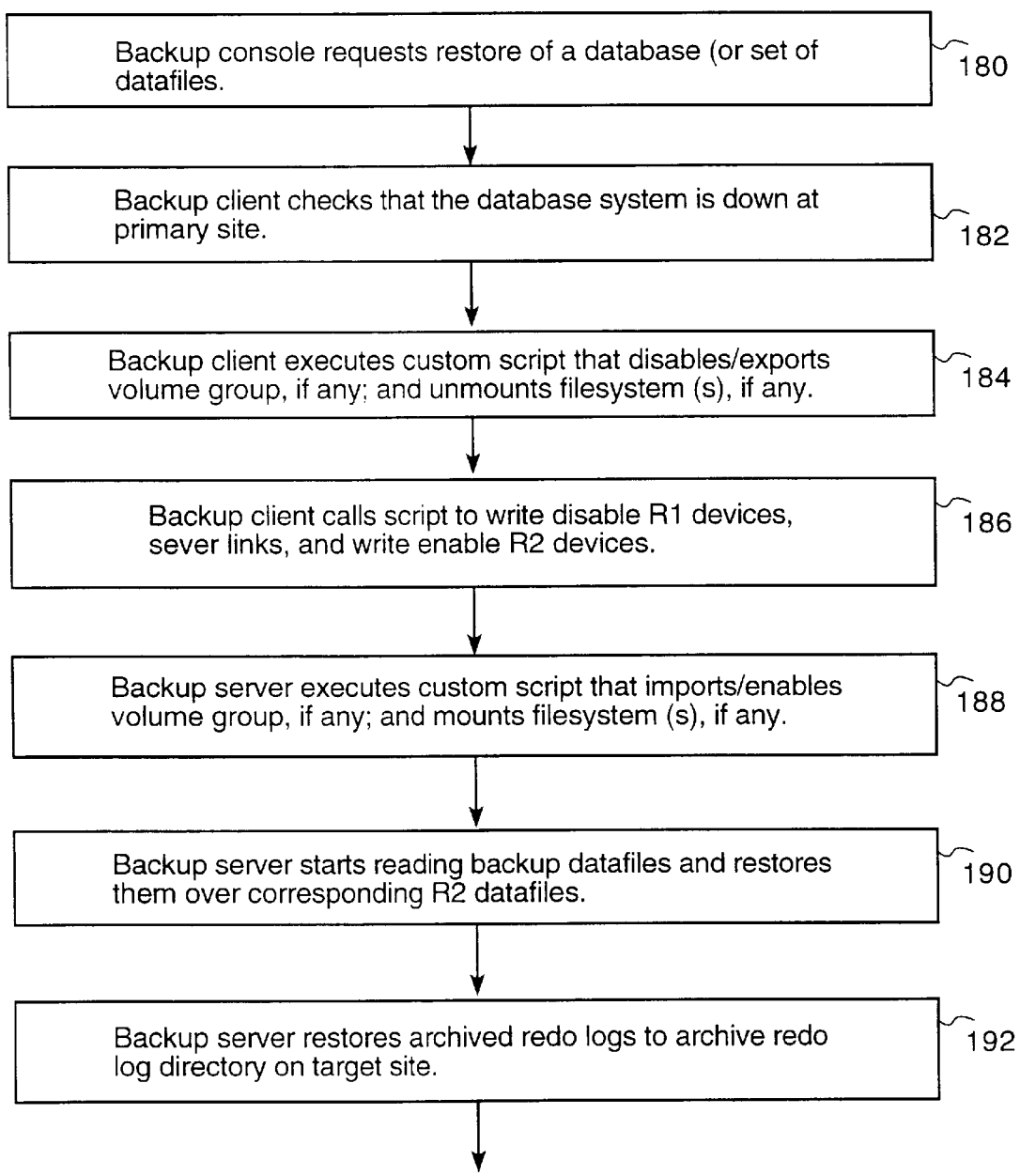
FIGS. 6A–C present a flow chart of the steps for performing a complete restore in the system shown in FIG. 1.
Figure 6B:
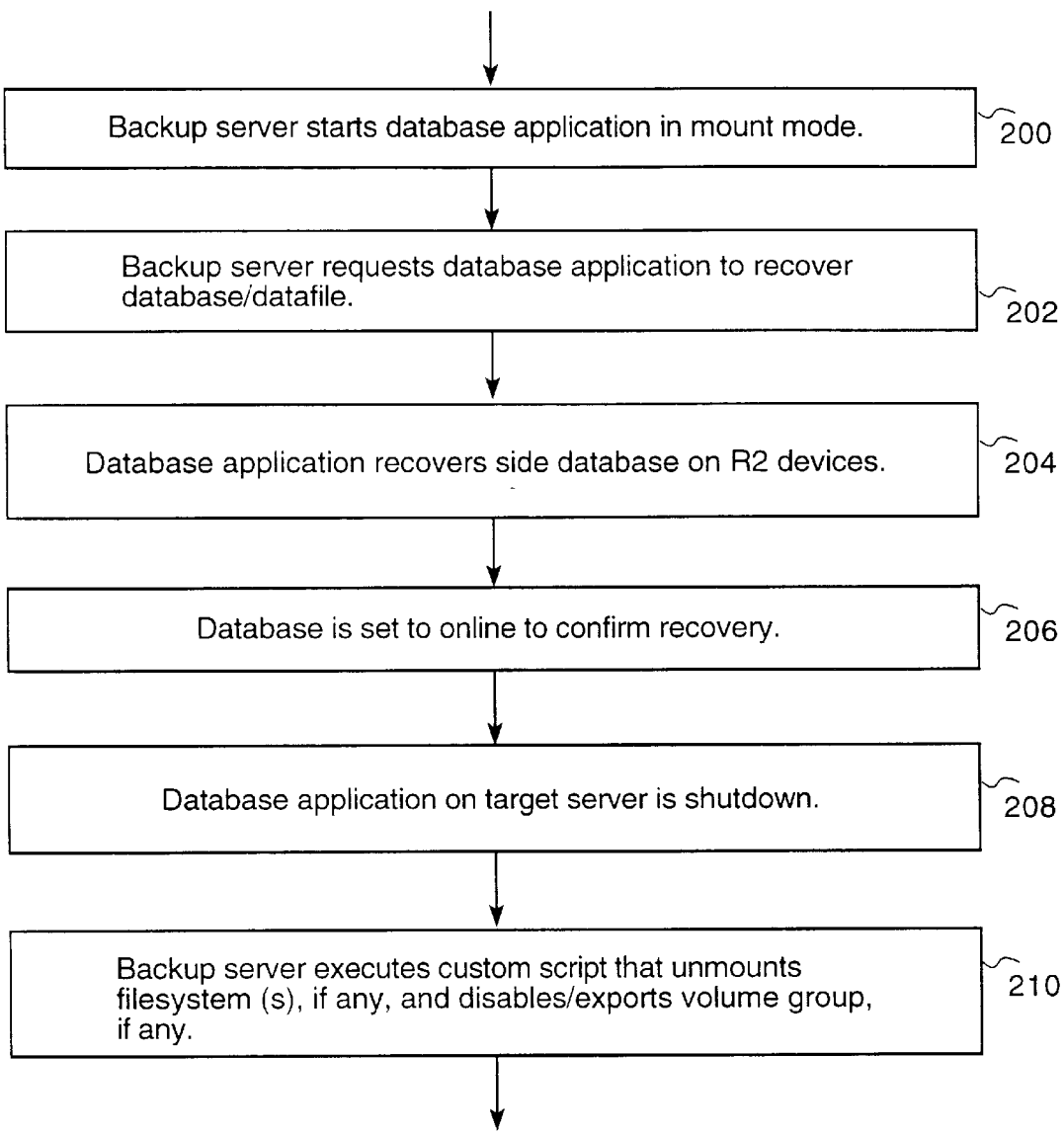
Figure 6C:
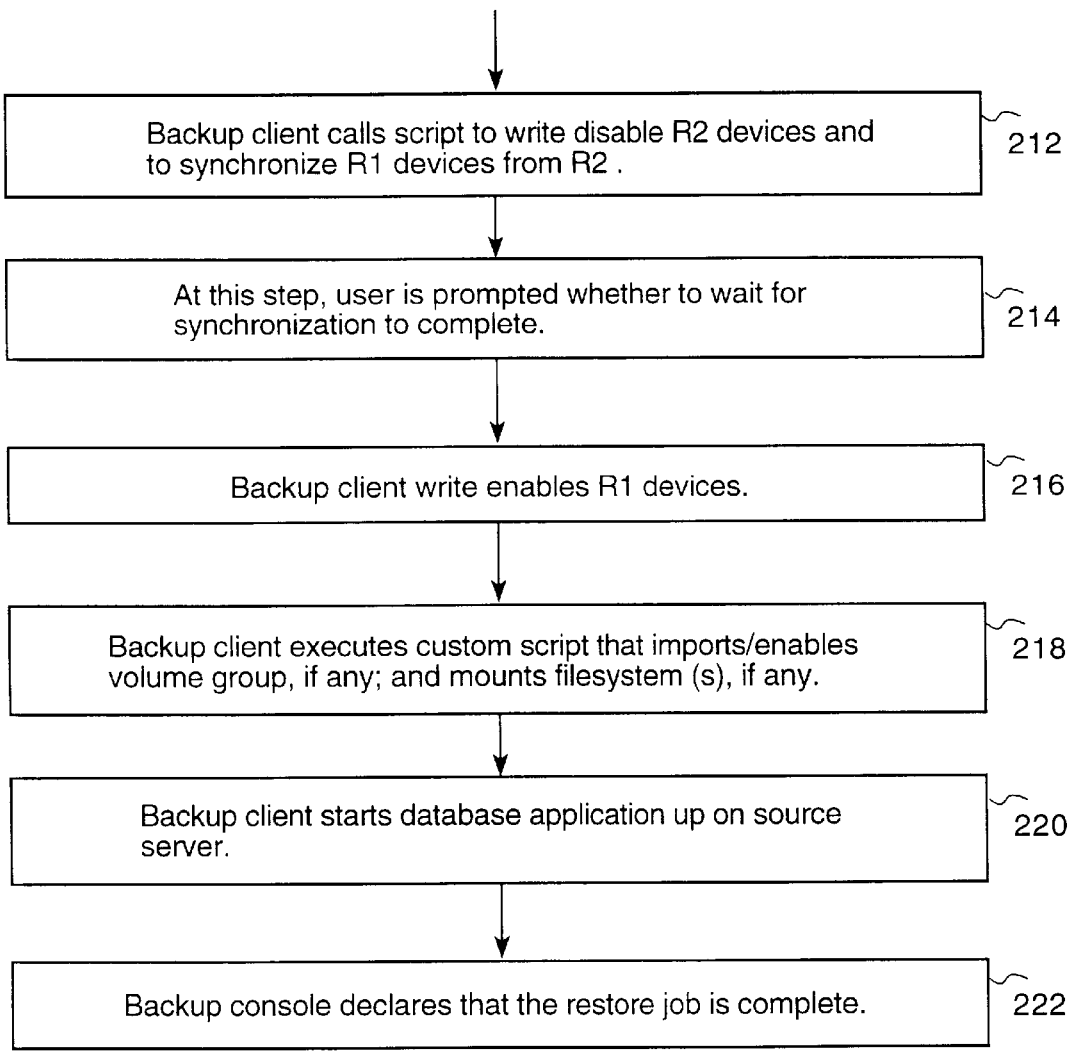

In the event that both databases have been corrupted (e.g. through an unintended deletion of records), it may be necessary to start a complete database restore on the slave side while the primary database is offline. In that case, the backup console requests a restore of the database (e.g., a set of datafiles) (step 180) (see FIGS. 6A–B). In response, the backup client checks that the database software is down at primary site (step 182). And, assuming that it is, the backup client then executes custom script that disables/exports the volume group(s), if any, and unmounts the file system(s), if any (step 184). The backup client then calls a script which when executed instructs the data storage systems to write disable the R1 devices, to bring down the high speed link, and to write enable the R2 devices (step 186).

The backup server then executes a custom script that imports/enables the volume group(s), if any, and mounts file system(s), if any (step 188). Then, the backup server starts reading the backup datafiles from the tape drives and restores them over the corresponding R2 datafiles in the slave unit (step 190). After the datafiles have been written to the slave unit, the backup server restores the archived redo logs to archive redo log directory on the target site (step 192).

With the backup copies of the datafiles and the archived redo logs now available in the data storage system, the process for recovering the side database on target site begins. First, the backup server starts the database application software in mount mode (step 200). Then, the backup server requests the database software to recover the database/datafile (step 202). And in response, the database software recovers the side database on the R2 devices (step 204). With the recovery complete, the database application is set to online to confirm recovery (step 206). Once confirmed, the database application on the target server is shutdown (step 208). And the backup server then executes custom script that unmounts the file system(s), if any, and disables/exports the volume group(s), if any (step 210).

It should be understood that the recovery could also take place on the source side by simply sending the backup copies and the archived redo logs over to the of the source side.

With the database restored in the secondary data storage system, the offline database on the master side is then restored. This is done by the backup client calling a script which when executed instructs the data storage systems to write disable the R2 devices, bring up the high speed connection between the master and the slave unit, and then synchronizes the R1 devices from the R2 devices (step 212).

The bit maps are used to perform the synchronization and to determine where the valid data is throughout the process. Prior to establishing the link, the slave unit enters ones in the M1 side of its bit map to indicate that all tracks on the slave side have the most recent or valid data. When the link is reestablished, the bit maps on the master side are synchronized with those on the slave side so that they both have the same view of the data. Then during synchronization of R1 with R2, all tracks that are marked in R2 (i.e., the tracks for which the M1 field contains a one) are transferred to R1 and the appropriate locations in the bits maps are cleared to indicate that the tracks are synchronized.

At this point, the user is prompted whether to wait for synchronization to complete (step 214). The backup client then write enables the R1 devices (step 216). It also executes a custom script that imports/enables the volume group(s), if any, and mounts the file system(s), if any (step 218). Next, the backup client starts the database application on the source server (step 220). At that point, the backup console declares that the restore job is complete (step 222).

Note that the backup client need not wait for synchronization to complete before commencing with processing of further transactions. Since the bit maps tell the master unit where the valid data is, the master unit can direct the transactions to the appropriate one of the two data storage systems. For example, if a transaction requires a read of or a write to a particular track that has not yet synchronized with R2 (as indicated by a 1 in the M2 side of the bit map), the master unit can direct the read/write to the corresponding track in R2.

Figure 7A:
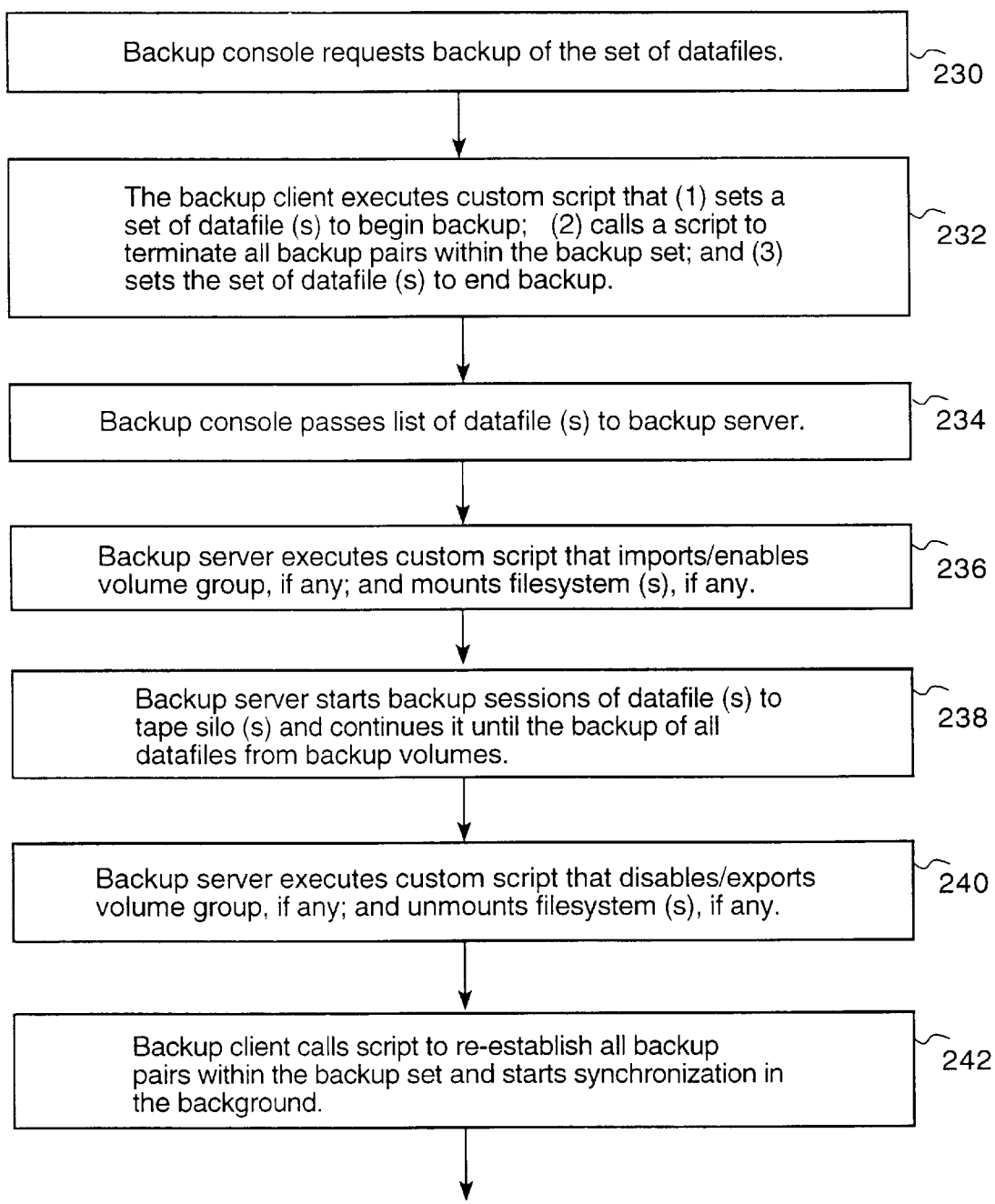
FIGS. 7A–B present a flow chart of the steps for performing an MMF-based backup.
Figure 7B:
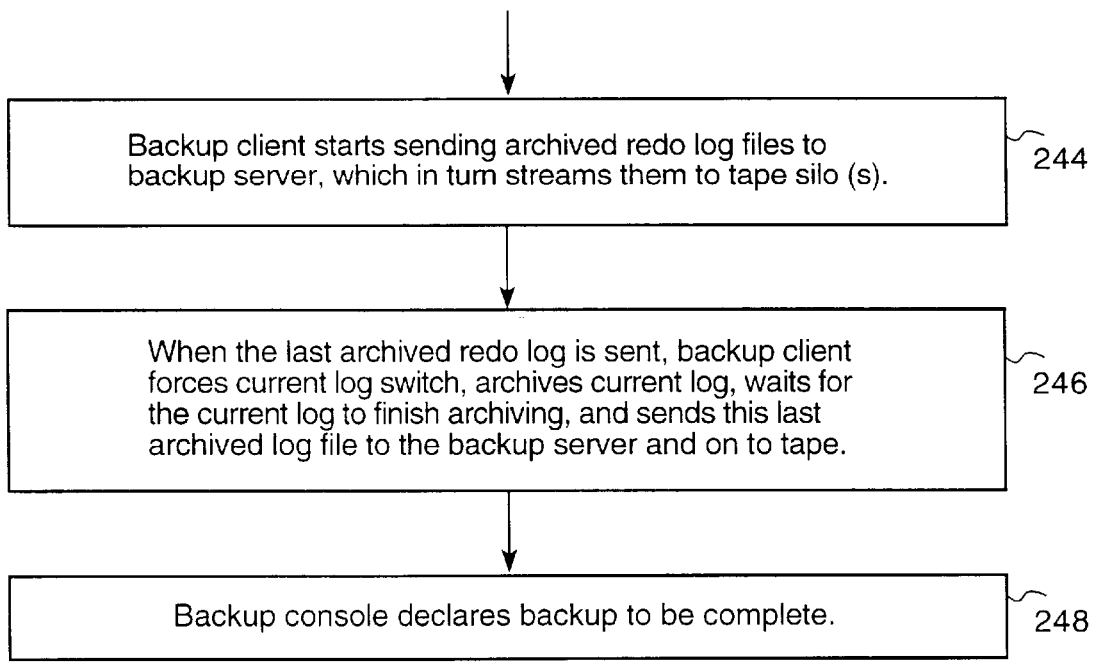

MMF-Implemented Backup:

FIGS. 7A–B illustrate in greater detail the steps that are performed in creating a backup in the embodiment shown in FIG. 1B.

In this embodiment, every volume containing the database, except the archived redo log directory, is paired with a backup volume within the same data storage unit. The backup volumes constitute a backup set and they are not available to any host processor at this time. Actually, since the setup which is to be described is only for backup (i.e., no decision support is required), the online redo log files should not be on the paired volumes.

The backup console begins by requesting a backup of the set of datafiles (step 230). In response, the backup client executes a custom script that (1) sets a set of datafiles(s) to begin backup; (2) calls a script within the data storage system to terminate all backup pairs within the backup set; and (3) sets the set of datafile(s) to end backup (step 232). At this point, the backup volumes are available to the backup server/host.

The backup console then passes a list of datafile(s) to backup server (step 234).

Next, the backup server executes a custom script that imports/enables volume group(s), if any, and mounts the file system(s), if any (step 236). After this, the backup server starts backup sessions of the datafile(s) to the tape silo(s) until all datafiles from the backup volumes have been transferred (step 238). The backup server then executes another custom script that disables/exports the volume group (s), if any, and unmounts the file system(s), if any (step 240).

The final phase of the online backup begins with the backup client calling a script which when executed instructs the data storage system to re-establish all backup pairs within the backup set (step 242). This again makes the backup volumes not available to the backup server/host. In the background, any changes that were made to the M1 devices start synching to the backup devices M2.

As in the case of the RDF-implemented backup described above, bit maps are also used to perform the synchronization. There is a set of bit maps for M1 and another set for M2, just as there was a set of bit maps for R1 and another set of bit maps for R2. And the data storage system uses the bit maps in precisely the same way as was described previously.

The backup client starts sending archived redo log files to the backup server, which in turn streams them to tape silo(s) (step 244). When the last archived redo log is sent, the backup client forces a current log switch, archives the current log, waits for the current log to finish archiving, and then sends this last archived log file to the backup server, which in turn sends it on to tape (step 246).

Alternatively, the backup server could be given direct access to the archived redo logs stored in the data storage system, and it could send them to the tape storage without the need of the backup client being involved.

With the current redo log on tape, the backup console declares backup to be complete (step 248). As in the previous example, no new backup session can start until M1 and the backup devices (i.e., M2) are fully synched.

MMF-Based Restores

After a backup has been completed in the manner described above, either a partial or a complete restore can be performed. Each of these operations will now be described.

A Partial Restore

Referring to FIG. 8, to begin a partial restore to an online database, the backup console requests a restore of a set of Datafiles (step 260). In response, the backup client checks that either database is down or the corresponding tablespace is offline (step 262). Then, the backup client calls a script which when executed instructs the data storage system to terminate all backup pairs (step 264).

Once the pairs have been terminated, the backup server starts sending datafiles over the network to the backup client. And the backup client, in turn, restores them over the corrupted datafiles (step 266). After the corrupted files have been replaced, the backup server sends the archived redo logs to backup client, which in turn restores them to the archived redo log directory (step 268). Alternatively, the backup server could be given access to the archived redo log directory, in which case, it could send the archived redo logs to that directory without the assistance of the backup client.

The backup client then requests the database application to recover the datafile, tablespace, or database (step 270). After the database application completes the recovery, the backup client sets the database or alters the tablespace(s) to online (step 272).

With this completed, the backup console prompts user whether to re-establish the backup pairs (step 274). If the answer is affirmative, the backup client calls a script which when executed instructs the data storage system to reestablish the backup pairs (step 274). If backup pairs are re-established, M1 changes start synching to the backup devices in the background (step 276). Again, at this point, the backup volumes will no longer be available to the backup server/host. And the backup console declares the restore job to be complete (step 278).

A Complete Restore

Figure 9A:
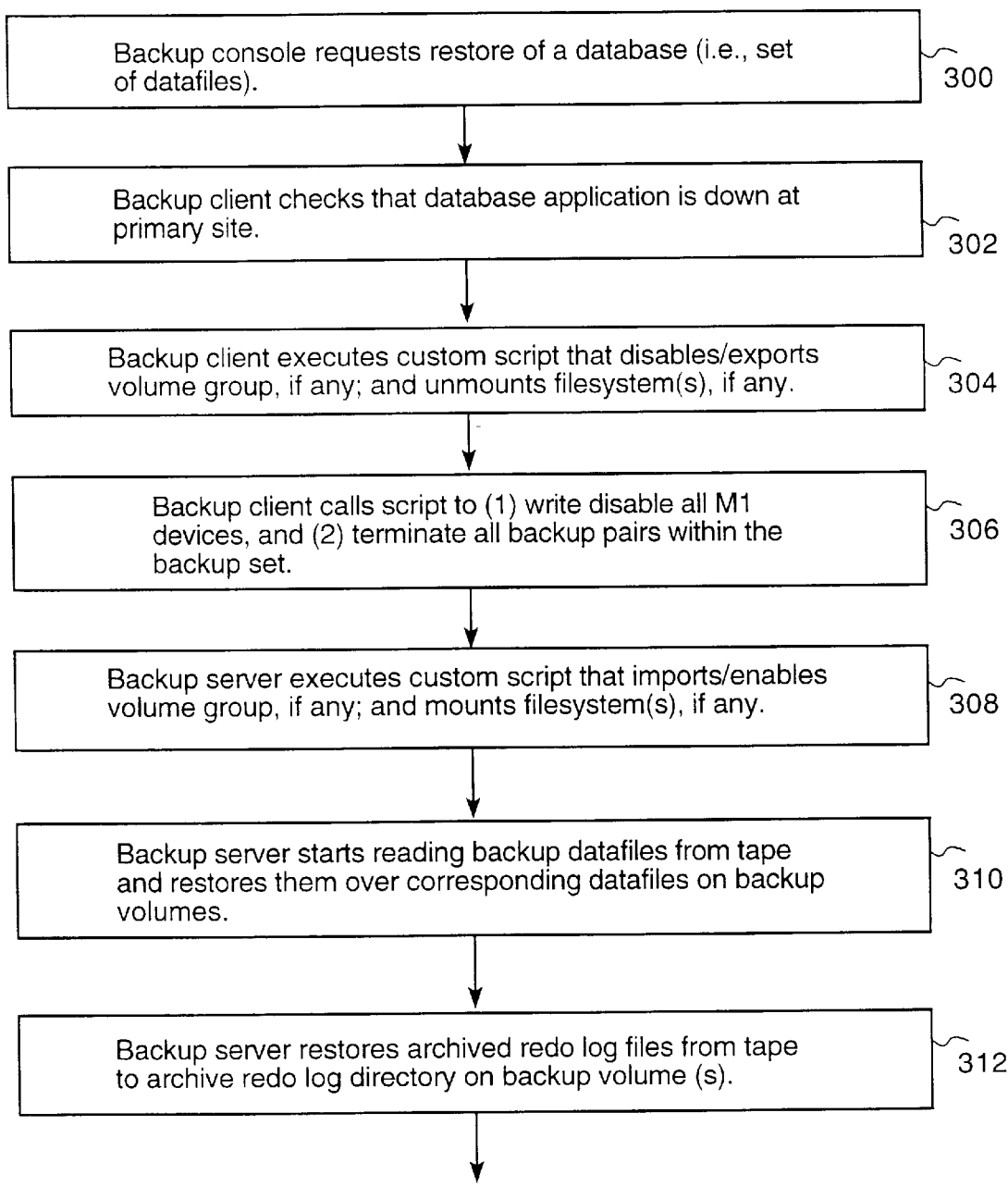
FIGS. 9A–C present a flow chart of the steps for performing a complete restore in the system shown in FIG. 1.
Figure 9B:
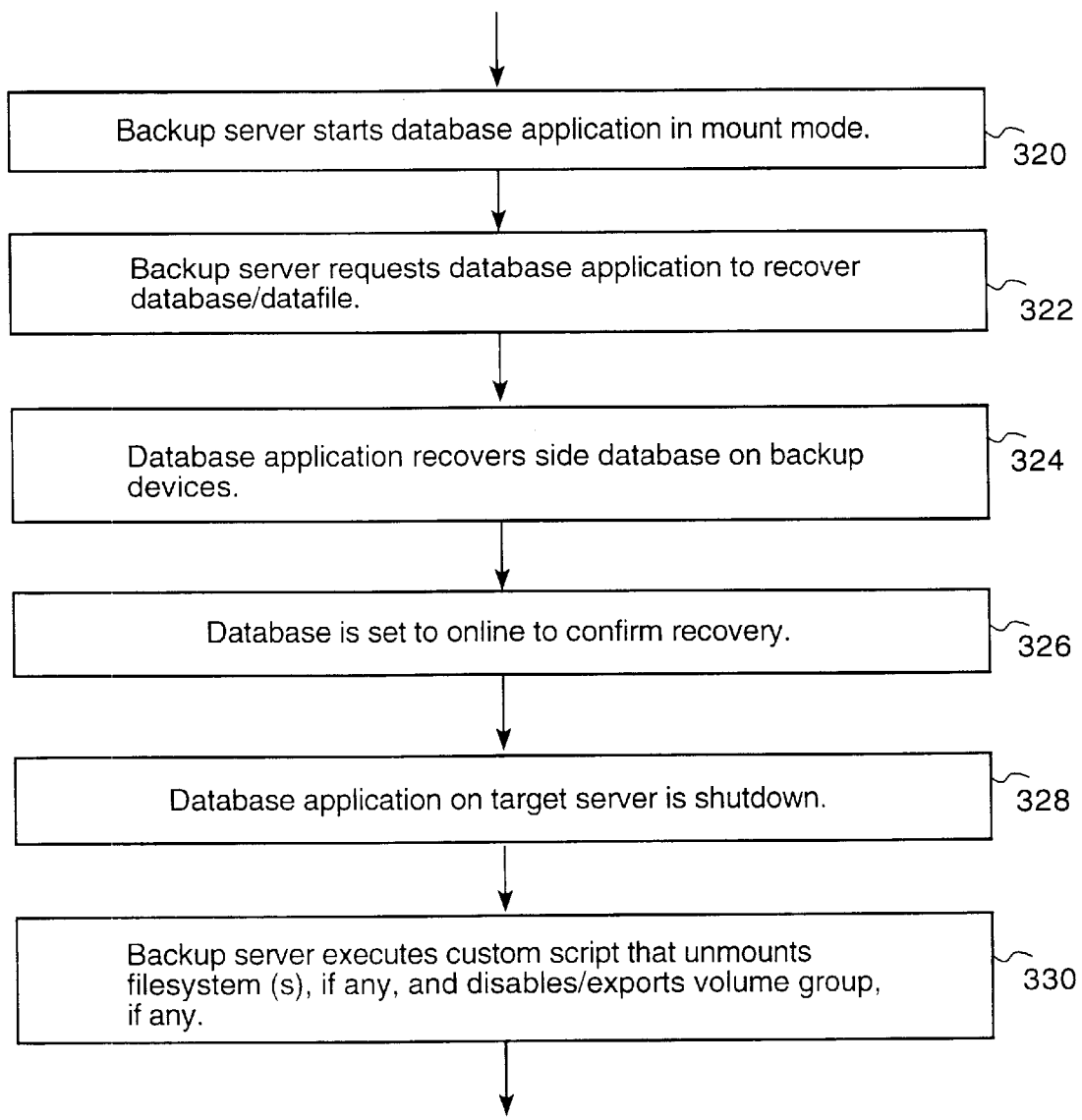
Figure 9C:
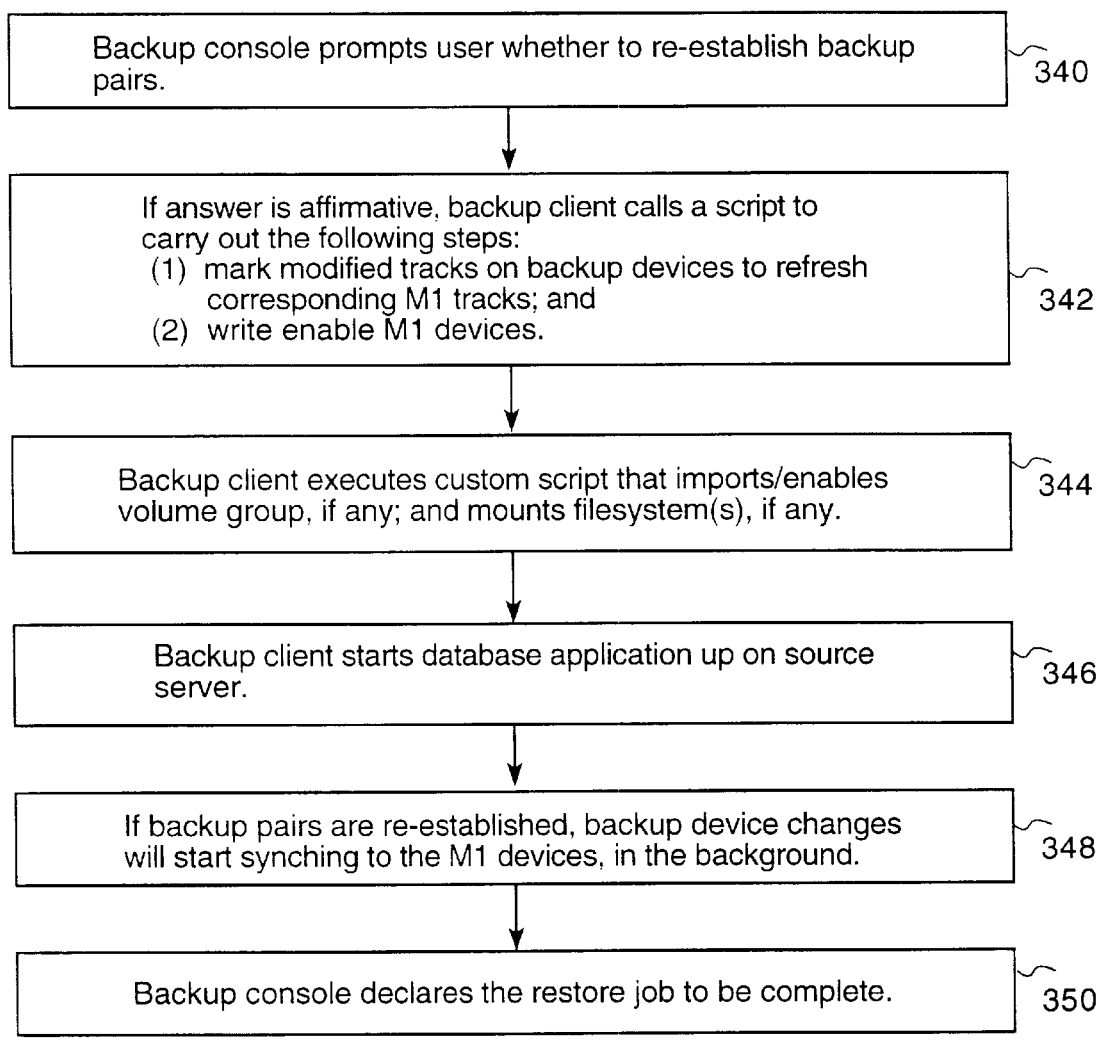

The method for performing a complete restore to a side database while primary database is offline is depicted in FIGS. 9A–C.

It begins by the backup console requesting a restore of a database (e.g. a set of datafiles) (step 300). In response, the backup client checks that database application is down at primary site (step 302). Assuming that it is, the backup client then executes a custom script that disables/exports the volume group(s), if any, and unmounts file the system(s), if any (step 304). And the backup client calls a script which when executed instructs the data storage system to write disable all M1 devices, and to terminate all backup pairs within the backup set (step 306). At that point, the backup volumes become available to the backup server/host.

The backup server executes a custom script that imports/enables the volume group(s), if any, and mounts the file system(s), if any (step 308). Next, the backup server starts reading backup datafiles from tape and restores them over corresponding datafiles on the backup volumes (step 310). When the reading of backup datafiles is complete, the backup server restores the archived redo log files from tape to the archive redo log directory on the backup volume(s) (step 312).

This establishes the conditions required for recovering the side database on the backup volumes. So, referring to FIG. 9B, the backup server starts the database application in mount mode (step 320). And it requests the database application to recover the database/datafile (step 322). In response, the database application recovers the side database on the backup devices (step 324). After finishing recovery, the database is set to online to confirm recovery (step 326). Once recovery is confirmed, the database application on the target server is shutdown (step 328). And the backup server executes a custom script that unmounts the file system(s) if any, and disables/exports the volume group(s), if any (step 330).

Referring to FIG. 9C, the process of restoring to an offline database is finished by the backup console prompting the user whether to re-establish backup pairs (step 340). If answer is affirmative, the backup client calls a script which when executed instructs the data storage system to perform a number of functions (step 342). First, it marks modified tracks on the backup devices to refresh the corresponding M1 tracks. Then, it re-establishes the backup pairs and write enables the M1 devices. The backup client executes a custom script that imports/enables the volume group(s), if any, and mounts the file system(s), if any (step 344). Finally, the backup client starts up the database application on source server (step 346).

If backup pairs are re-established, the backup device changes start synching to the M1 devices, in the background (step 348). Thus, the backup volumes are again not available to the backup server/host. And the backup console declares the restore job to be complete (step 350).

Other embodiments are within the following claims. For example, the above described techniques apply to all types of systems in addition to database systems, e.g. file systems, volume managers, log devices, and all hosts. The only requirement is that there be a software application for implementing the functionality on the host. It is independent of the type of software that is running or the operating system.

What is claimed is:

1. A method of generating in a tertiary storage device a backup copy of data, said method comprising:

writing data to a first set of storage volumes;

while data is being written to the first set of storage volumes, mirroring the contents of the first set of storage volumes into a second set of storage volumes;

after an amount of data has been written to the first set of volumes, terminating the mirroring;

while mirroring is terminated, continuing to write data to the first set of volumes thereby causing the second set of volumes to become unsynchronized from the first set of volumes;

while mirroring is terminated, generating archived redo logs for transactions that are applied to data stored in the first set of storage volumes;

while the mirroring is terminated, backing up data stored in the second set of volumes to the tertiary storage device;

after backing up the second set of volumes, resuming mirroring of the first set of volumes to the second set of volumes;

after backing up the second set of volumes, transferring the archived redo logs to the tertiary storage device;

storing the archived redo logs in the tertiary storage device along with the backed up data that was stored in the tertiary storage device; and after resuming mirroring, incrementally resynchronizing the first and set sets of volumes with each other.

2. The method of claim 1, further comprising:

providing a single data storage system with a plurality of data storage volumes; and partitioning the plurality of data storage volumes into the first and second sets of storage volumes.

3. The method of claim 1, further comprising:

providing a first data storage system;

providing a second data storage system that is separate form the first data storage system;

directly connecting the first and second data storage systems through a communication link;

establishing the first set of storage volumes within the first data storage system; and establishing the second set of storage volumes within the second data storage system, and wherein the step of incrementally resynchronizing the first and second sets of storage volumes takes place over the communication link.

4. The method of claim 1 further comprising:

defining a first map of the first set of storage volumes, said first map providing a mechanism for identifying which portions of the first set of storage volumes become out of synch with counterparts in the second set of storage volumes due to modifications which occur to the first set of storage volumes while mirroring is terminated;

defining a second map of the second set of storage volumes, said second map providing a mechanism for identifying which portions of the second set of storage volumes become out of synch with counterparts in the first set of storage volumes due to modifications which occur to the second set of storage volumes while mirroring is terminated; and wherein the step of resynchronizing the first and second sets of storage volumes comprises using the first and second maps to identify which portions of the second set of storage volumes need to be refreshed from the first set of storage volumes to achieve resynchronization.

5. The method of claim 1 further comprising providing a tape drive storage device as the tertiary storage device.

6. The method of claim 1 further comprising:

providing a first processor connected to the first data storage system, wherein the first processor is running a database application which is processing transactions and writing data from those transactions to the first set of storage volumes;

providing a tape drive storage device as the tertiary storage device; and providing a second processor connected to the second data storage system, wherein tape drive storage device is connected to the second processor which performs the backing up of data in the second set of volumes to the tape drive storage device.

7. The method of claim 4 wherein the first map comprises a first set of submaps equal in number to the number of volumes in first set of storage volumes and each of which corresponds to a different one of the volumes in the first set of storage volumes, wherein the second map comprises a second set of submaps equal in number to the number of volumes in second set of storage volumes and each of which corresponds to a different one of the volumes in the second set of storage volumes.

8. The method of claim 7 wherein each of the volumes of the first and second sets of volumes is made up of a corresponding set of tracks, and wherein each of the submaps of the first and second sets of submaps has a number of records that is equal to the number of tracks in the set of tracks of the volume corresponding to that submap.

9. The method of claim 4 further comprising:

generating a first ordered list of identifiers of records within the combined map that have changed;

generating a second ordered list of identifiers of records within the second map that have been changed; and using the first and second generated lists of identifiers to perform incremental resynchronization.

10. A method of generating a backup of data, said method comprising:

providing a first data storage system, a second data storage system, and a communications path connecting the first data storage system to the second data storage system;

linking a first region of storage in the first data storage system to a corresponding second region of storage in the second data storage system so that data written to the first region of the first data storage system is automatically written to the corresponding second region in the second data storage system;

generating in the first data storage system a first map of said first region of storage in the first data storage system, said first map providing a mechanism for identifying which portions of said first region of storage become out of synch with counterparts in the second region storage due to modifications which occur to the first region of storage while unlinked from the second region of storage;

generating in the second data storage system a second map of said second region of storage in the second data storage system, said second map providing a mechanism for identifying which portions of the second region of storage become out of synch with counterparts in the first region of storage due to modifications which occur to the second region of storage while unlinked from the first region of storage;

unlinking the first region of storage in the first data storage system from the second region of storage in the second data storage system so that data written to the first region of the first data storage system is no longer automatically written to the second region of storage in the second data storage system;

after unlinking, continuing to write data to the first region of storage in the first data storage system;

using the first and second maps in the first and second data storage systems to record where changes are made to the first and second regions on the first and second data storage systems, respectively;

relinking the first region of storage in the first data storage system to the second region of storage in the second data storage system so that data written to the first region of the first data storage system is again also automatically written to the second region of storage in the second data storage system; and after relinking, resynchronizing the first region and the second region with each other, said resynchronizing step using the first and second maps.

* * * * *